United States Patent
Tamura (10) Patent No.: US 10,542,510 B2
(45) Date of Patent: Jan. 21, 2020

(54) COMMUNICATION APPARATUS, CONTROL METHOD, AND COMPUTER-READABLE STORAGE MEDIUM

(71) Applicant: CANON KABUSHIKI KAISHA, Tokyo (JP)

(72) Inventor: Ichiro Tamura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 110 days.

(21) Appl. No.: 15/404,611

(22) Filed: Jan. 12, 2017

(65) Prior Publication Data
US 2017/0208559 A1 Jul. 20, 2017

(30) Foreign Application Priority Data
Jan. 19, 2016 (JP) ................................ 2016-008291

(51) Int. Cl.
*H04W 56/00* (2009.01)
*H04W 8/00* (2009.01)
*H04W 84/12* (2009.01)

(52) U.S. Cl.
CPC ......... *H04W 56/002* (2013.01); *H04W 8/005* (2013.01); *H04W 84/12* (2013.01)

(58) Field of Classification Search
None
See application file for complete search history.

(56) References Cited

U.S. PATENT DOCUMENTS

| 9,014,641 | B2 | 4/2015 | Tamura |
| 2014/0302787 | A1 | 10/2014 | Rantala et al. |
| 2015/0109961 | A1* | 4/2015 | Patil ............... H04W 8/005 370/254 |
| 2015/0146645 | A1 | 5/2015 | Sergeyev et al. |
| 2015/0163823 | A1 | 6/2015 | Sadek et al. |

(Continued)

FOREIGN PATENT DOCUMENTS

| CN | 104053227 A | 9/2014 |
| CN | 104780510 A | 7/2015 |

(Continued)

OTHER PUBLICATIONS

European Office Action corresponding to European Patent Appln. No. 16204219.6 dated May 16, 2018.
(Continued)

*Primary Examiner* — Alex Skripnikov
(74) *Attorney, Agent, or Firm* — Carter, DeLuca & Farrell LLP (57) ABSTRACT

There is provided a communication apparatus capable of performing first communication with a first other communication apparatus in a first duration which comes at a predetermined time interval, and performing, based on the first communication, second communication with the first other communication apparatus by setting a second duration different from the first duration. The communication apparatus identifies one or more third durations during which the first communication is performed by each of one or more second other communication apparatuses, and identifies, as the second duration, at least part of a duration usable for the second communication based on the one or more third durations.

9 Claims, 7 Drawing Sheets

(56) References Cited

U.S. PATENT DOCUMENTS

2015/0350866 A1* 12/2015 Patil .................... H04W 40/244
                                                    370/254
2016/0183171 A1*  6/2016 Hareuveni ............ H04W 64/00
                                                    370/328
2017/0223563 A1*  8/2017 Yang ................. H04W 74/0808

FOREIGN PATENT DOCUMENTS

WO      2015/057955 A1    4/2015
WO      2015/187255 A1    12/2015

OTHER PUBLICATIONS

Camps-Mur, Daniel et al, "Enabling always on service discovery: Wifi neighbor awareness networking", IEEE Wireless Communications, vol. 22, No. 2, Apr. 2015, pp. 118-125.
Extended European Search Report issued in corresponding application No. 16204219.6 dated Apr. 24, 2017.
Japanese Office Action for application No. 2016-008291 dated Sep. 17, 2019 with English translation.
Chinese Office Action for application No. 201710028353.6 dated Aug. 23, 2019 with English translation.

* cited by examiner

COMMUNICATION APPARATUS, CONTROL METHOD, AND COMPUTER-READABLE STORAGE MEDIUM

BACKGROUND OF THE INVENTION

Field of the Invention

The present invention relates to a technique of scheduling wireless communication.

Description of the Related Art

A wireless LAN system represented by IEEE802.11 is widely used. In the wireless LAN, a base station called an access point (to be referred to as an "AP" hereinafter) controls a network. A wireless network is formed by the AP and stations (STAs) which fall within the radio wave coverage of the AP and are in a wirelessly connected state.

Furthermore, products and standards for various network forms of the wireless LAN have appeared on the market, in addition to this conventional simple wireless network configuration of the AP and STAs. U.S. Patent Application Publication No. 2014/0302787 describes Neighbor Awareness Networking (NAN) which is defined by Wi-Fi Alliance as a standard for discovering a communication apparatus and a service provided by it with low power consumption. This is intended to reduce the power consumption by which a communication apparatus synchronizes with another communication apparatus in terms of a duration in which information is exchanged with the other communication apparatus, and thus shortens the time during which a wireless RF (Radio Frequency) part is enabled. This synchronization duration in NAN is called a Discovery Window (DW). In NAN, communication of service information is executed in a DW duration. The DW is defined by the time and channel (such as a frequency) to be used by a plurality of devices for executing NAN communication. A set of terminals which share the schedule of DWs is called a NAN cluster.

Each communication apparatus (to be referred to as a "NAN device" hereinafter) belonging to the NAN cluster operates in one of master, non-master sync, and non-master non-sync roles. The NAN device operating in the master role periodically transmits a synchronization beacon (to be referred to as a "sync beacon" hereinafter) as a beacon for causing another terminal to identify the DW and synchronize with the DW duration. In addition, the NAN device operating in the master role transmits a discovery beacon as a signal for causing a terminal, which does not belong to the NAN cluster, to recognize the NAN cluster. The discovery beacon is transmitted in a duration other than the DW durations, for example, every 100 ms. Note that at least one NAN device in each NAN cluster operates in the master role. The NAN device operating in the non-master sync role transmits not a discovery beacon but a sync beacon. The NAN device operating in the non-master non-sync role transmits neither a sync beacon nor a discovery beacon.

The NAN device joining the NAN cluster executes communication about service information in the DW duration by synchronizing with the DW duration which comes every predetermined cycle in accordance with the sync beacon transmitted in the NAN cluster. More specifically, the NAN device transmits or receives at least one of a subscribe message as a signal for discovering a service and a publish message as a signal for sending a notification of provision of a service. Furthermore, the NAN device can transmit/receive follow-up messages for exchanging additional information about a service in the DW duration. Note that the publish, subscribe, and follow-up messages will be collectively referred to as service discovery frames (SDFs) hereinafter.

The respective NAN devices can advertise or detect the service by transmitting/receiving the SDFs. The SDF includes a service ID as an identifier for identifying a target service. The NAN device can discover/detect a service by transmitting/receiving SDFs to/from another NAN device.

When the NAN device performs communication of an application for actually executing a service after discovering/detecting the service, it can establish not NAN but post NAN. Post NAN is a network different from NAN, such as an infrastructure network, IBSS, or Wi-Fi Direct. The NAN device establishes post NAN, thereby allowing communication by the application. Note that the NAN device can also perform communication by establishing a NAN data link not in post NAN but in the NAN system. That is, the NAN device can communicate with another NAN device in the NAN cluster by setting a communication duration other than the DW durations in NAN without setting a network different from NAN.

The communication duration of the application between the NAN device and another apparatus in the NAN cluster can overlap the DW duration of another nearby NAN cluster to which the NAN device does not belong. In this case, a wireless signal by the application may have an influence on, for example interfere with, a wireless signal to be transmitted/received in the DW duration of the nearby NAN cluster. That is, the wireless signal by the application may inhibit communication in the DW duration of another NAN cluster.

Similarly, even in a system other than the NAN system, the same problem may arise if the system sets a duration of a predetermined time length which periodically comes, and performs communication in the duration, and can further perform communication in a duration other than that duration.

According to the present invention, a communication apparatus performs communication without inhibiting communication of another apparatus in a duration which periodically comes.

SUMMARY OF THE INVENTION

According to one aspect of the present invention, there is provided a communication apparatus comprising: a communication unit capable of performing first communication with a first other communication apparatus in a first duration which comes at a predetermined time interval, and performing, based on the first communication, second communication with the first other communication apparatus by setting a second duration different from the first duration; and an identification unit configured to identify one or more third durations during which the first communication is performed by each of one or more second other communication apparatuses, and identify, as the second duration, at least part of a duration usable for the second communication based on the one or more third durations.

According to another aspect of the present invention, there is provided a communication apparatus comprising: a communication unit configured to communicate information about a service in a first discovery window of Neighbor Awareness Networking, and perform communication by an application for the service in a duration different from the first discovery window; a detection unit configured to detect a second discovery window for communicating information about a service by another communication apparatus; and a setting unit configured to set, as a duration in which the communication by the application for the service is performed, a duration different from the second discovery window detected by the detection unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

An example in which a wireless LAN system complying with the NAN (Neighbor Awareness Networking of Wi-Fi Alliance) standard is used will be described below. The present invention, however, is not limited to this. For example, the following discussion is applicable in a wireless communication system in which a communication apparatus can transmit/receive a wireless signal such as a service discovery signal to/from another communication apparatus in a duration (of a predetermined time length) such as a DW which comes at a predetermined time interval. In this case, when the communication apparatus performs communication in duration other than the first durations corresponding to the DWs, if it detects another apparatus capable of transmitting/receiving a wireless signal in a second duration different from the first duration, it performs communication by avoiding the second duration. This can prevent the communication apparatus from inhibiting communication of the other apparatus, which uses an intermittent communicable duration, in the duration. An apparatus arrangement and a processing procedure will be described in detail below.

Note that the following description assumes that communication in a duration other than the first duration corresponding to the DWs is performed not in post NAN but in a NAN data link. That is, assume that the NAN device sets a duration for data communication in a duration other than the DW durations in accordance with the NAN standard, and communicates with another NAN device belonging to the same NAN cluster in NAN. However, the present invention is not limited to this, and the NAN device may form, by post NAN, an arbitrary network to which the following discussion is applicable, thereby performing communication in a duration other than the DW durations.

(Configuration of Wireless Communication Network)

Figure 1:
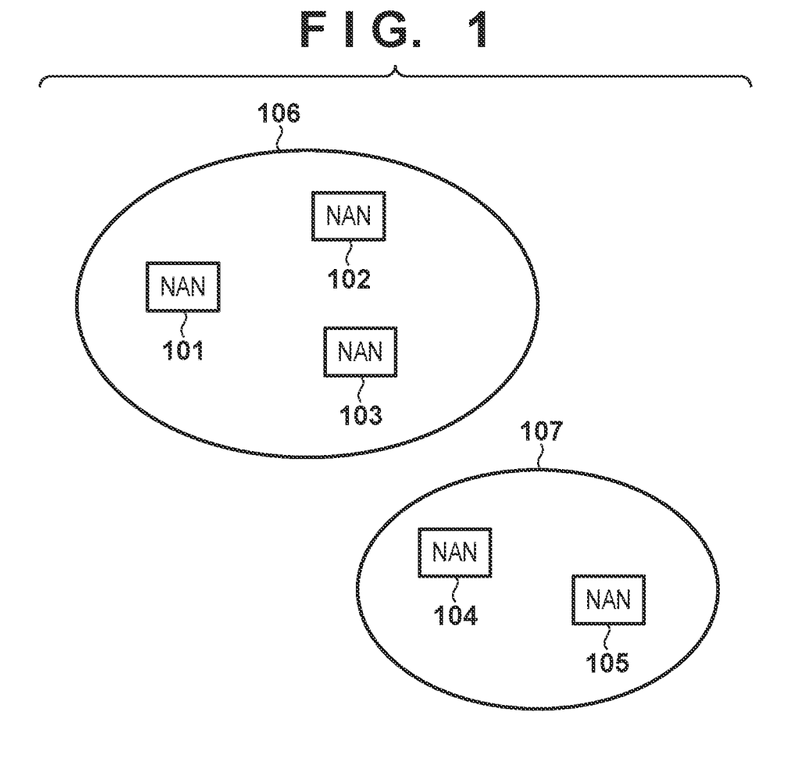
FIG. 1 is a view showing an example of the configuration of a wireless communication network.

FIG. 1 shows an example of the configuration of a wireless communication network according to this embodiment. This wireless communication network is formed by including, for example, NAN devices 101 to 105 as wireless communication apparatuses capable of operating in accordance with the NAN standard. Based on the NAN standard, each of the NAN devices 101 to 105 can discover nearby communication apparatuses and services provided by them, or provide a service providable by itself to nearby communication apparatuses. Note that any communication apparatus which can join NAN and perform communication by an application can be used as each of the NAN devices 101 to 105.

Assume that the NAN devices 101 to 103 join a NAN cluster 106, the NAN devices 101 and 103 operate in the non-master sync role, and the NAN device 102 operates in the master or anchor master role. Furthermore, assume that the NAN devices 104 and 105 join a NAN cluster 107, the NAN device 105 operates in the non-master sync role, and the NAN device 104 operates in the master or anchor master role. In addition, assume that the NAN device 101 serves as a subscriber which searches for a predetermined service, and the NAN device 103 serves as a publisher which can provide the predetermined service the NAN device 101 searches for.

In this embodiment, the NAN devices joining the NAN cluster 106 create a network using channel 6. Assume that in the NAN cluster 106, the time length of the DW duration is 16 TUs (Time Units), and the time length (that is, a cycle in which the DW duration comes) from the start timing of the DW duration to that of the next DW duration is an interval of 512 TUs. Note that 1 TU corresponds to 1,024 μsec. The arrangement of the DW durations and the wireless channel of NAN are not limited to them.

(Arrangement of NAN Device)

Figure 2:
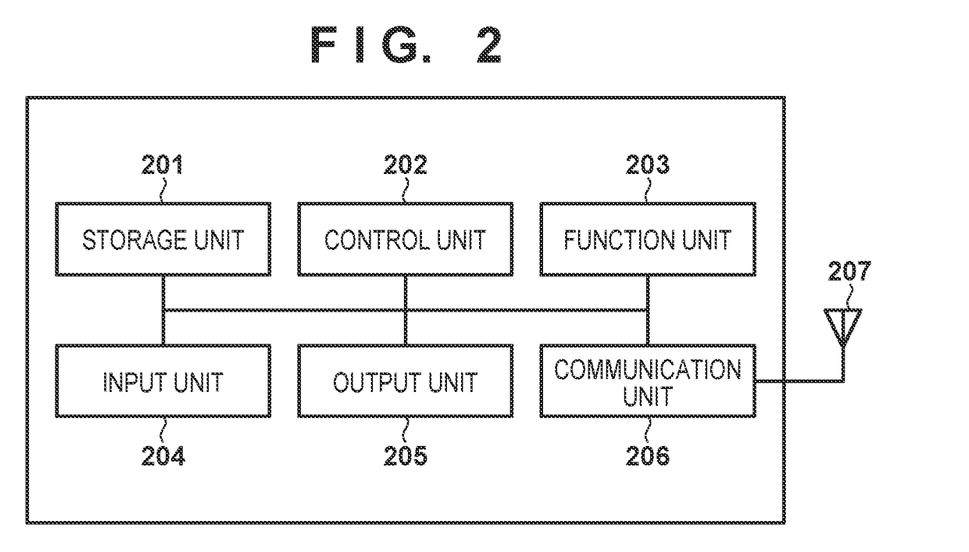
FIG. 2 is a block diagram showing an example of the hardware arrangement of a NAN device.

FIG. 2 shows the hardware arrangement of the NAN device 101. Note that each of the NAN devices 102 to 105 can have the same hardware arrangement as that of the NAN device 101. The NAN device 101 includes, as its hardware arrangement, a storage unit 201, a control unit 202, a function unit 203, an input unit 204, an output unit 205, a communication unit 206, and an antenna 207.

The storage unit 201 is formed by one or both of a ROM (Read Only Memory) and a RAM (Random Access Memory), and stores programs for executing various operations (to be described later) and various kinds of information such as wireless communication parameters. Note that instead of the memory such as the ROM or RAM, a storage medium such as a flexible disk, hard disk, optical disk, magnetooptical disk, CD-ROM, CD-R, magnetic tape, non-volatile memory card, or DVD may be used as the storage unit 201.

The control unit 202 is formed by a CPU (Central Processing Unit) or MPU (Micro Processing Unit), and controls the overall NAN device 101 by executing the programs stored in the storage unit 201. Note that the control unit 202 may control the overall NAN device 101 in cooperation with an OS (Operating System) and the programs stored in the storage unit 201. The control unit 202 controls the function unit 203 to execute predetermined processing such as image capturing, print, and projection.

The function unit 203 is hardware used by the NAN device 101 to execute predetermined processing. If, for example, the NAN device 101 is a camera, the function unit 203 serves as an image capturing unit, and performs image capturing processing. If, for example, the NAN device 101 is a printer, the function unit 203 serves as a printing unit, and performs print processing. If, for example, the NAN device 101 is a projector, the function unit 203 serves as a projection unit, and performs projection processing. Data processed by the function unit 203 may be data stored in the storage unit 201 or data communicated with another NAN device via the communication unit 206 (to be described later).

The input unit 204 accepts various operations from the user. The output unit 205 performs various kinds of output operations to the user. The output from the output unit 205 includes at least one of display on a screen, a voice output from a loudspeaker, a vibration output, and the like. Note that both of the input unit 204 and the output unit 205 may be implemented by one module like a touch panel.

The communication unit 206 controls wireless communication complying with the IEEE802.11 standard series, and controls IP (Internet Protocol) communication. The communication unit 206 controls the antenna 207 to transmit/receive a wireless signal for wireless communication. The NAN device 101 communicates a content such as image data, document data, or video data with another NAN device via the communication unit 206.

Figure 3:
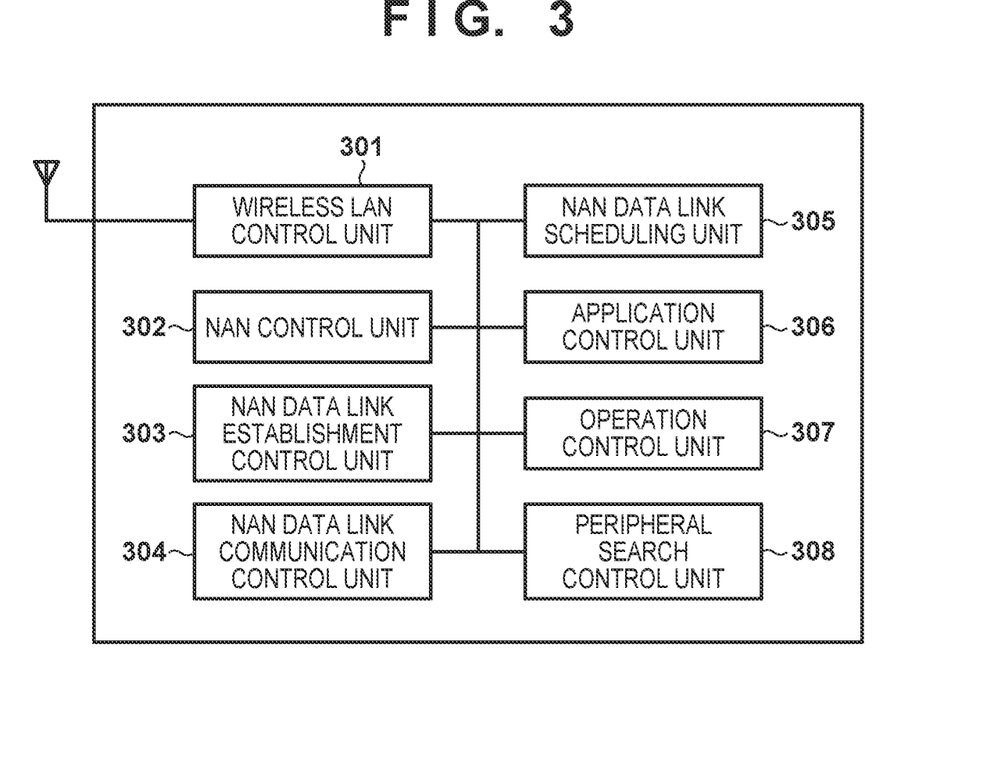
FIG. 3 is a block diagram showing an example of the functional arrangement of the NAN device.

FIG. 3 shows an example of the functional arrangement of the NAN device 101. Note that each of the NAN devices 102 to 105 can have the same functional arrangement as that of the NAN device 101. The NAN device 101 includes, for example, a wireless LAN control unit 301, a NAN control unit 302, a NAN data link establishment control unit 303, a NAN data link communication control unit 304, a NAN data link scheduling unit 305, and a peripheral search control unit 308. The NAN device 101 further includes an application control unit 306 and an operation control unit 307.

The wireless LAN control unit 301 executes control for transmitting/receiving a wireless signal in accordance with the signal format of a corresponding wireless LAN to/from a communication apparatus capable of performing communication by another wireless LAN. The wireless LAN control unit 301 executes various control operations related to the wireless LAN in accordance with the IEEE802.11 standard series. The NAN control unit 302 executes various control operations such as service search/discovery control in accordance with the NAN standard. The NAN data link establishment control unit 303 performs data link establishment control for performing data communication related to the application with another NAN device under the control of the NAN control unit 302. When a data link is established by the processing of the NAN data link establishment control unit 303, the NAN device 101 can perform data communication by the application. The NAN data link communication control unit 304 performs control for data communication related to the application via the data link established by the NAN data link establishment control unit 303. In this embodiment, as an example, the NAN data link communication control unit 304 performs control for IPv6 communication after the data link is established. When the NAN data link establishment control unit 303 establishes the data link, the NAN data link scheduling unit 305 performs scheduling control to determine the timing at which communication by the application is executed. Note that scheduling may be performed via negotiation between the NAN device 101 and a communication partner apparatus, or one of the NAN device 101 and the partner apparatus may independently determine a schedule. At the timing scheduled by the NAN data link scheduling unit 305, the NAN data link communication control unit 304 communicates application data.

The application control unit 306 performs control to execute a service discovered in NAN. If, for example, the NAN device 101 discovers a print service, the application control unit 306 performs control to execute an application of requesting a print job. If, for example, the NAN device 101 discovers a photo sharing service, the application control unit 306 performs control to execute an application of exchanging photo data. The NAN device 101 can search for a plurality of services, and may include a plurality of application control units 306 respectively corresponding to the services. In this embodiment, as an example, assume that a photo sharing application is executed between the NAN devices 101 and 103. Assume that the user of the NAN device 101 searches for a partner for sharing photos by the photo sharing application, and the user of the NAN device 103 stands by for being discovered from the apparatus which searches for a photo sharing partner by the photo sharing application. In this embodiment, assume also that the photo sharing application is executed via communication using IPv6. The operation control unit 307 manages an operation performed for the input unit 204 in FIG. 2 by the user of the NAN device 101. The operation control unit 307 transmits necessary signals corresponding to the operation to the remaining functional units such as the wireless LAN control unit 301, the NAN control unit 302, the NAN data link establishment control unit 303, the NAN data link communication control unit 304, and the NAN data link scheduling unit 305. The peripheral search control unit 308 performs control to search for the existence of a nearby NAN cluster or NAN device.

(Processing Procedure)

Processing executed by the above-described NAN device 101 will be described. Note that in the following description, the NAN device 101 is the entity for executing the processing. However, the following processing may be executed by another NAN device (for example, one of the NAN devices 102 to 105).

Processing Example 1

Figure 4:
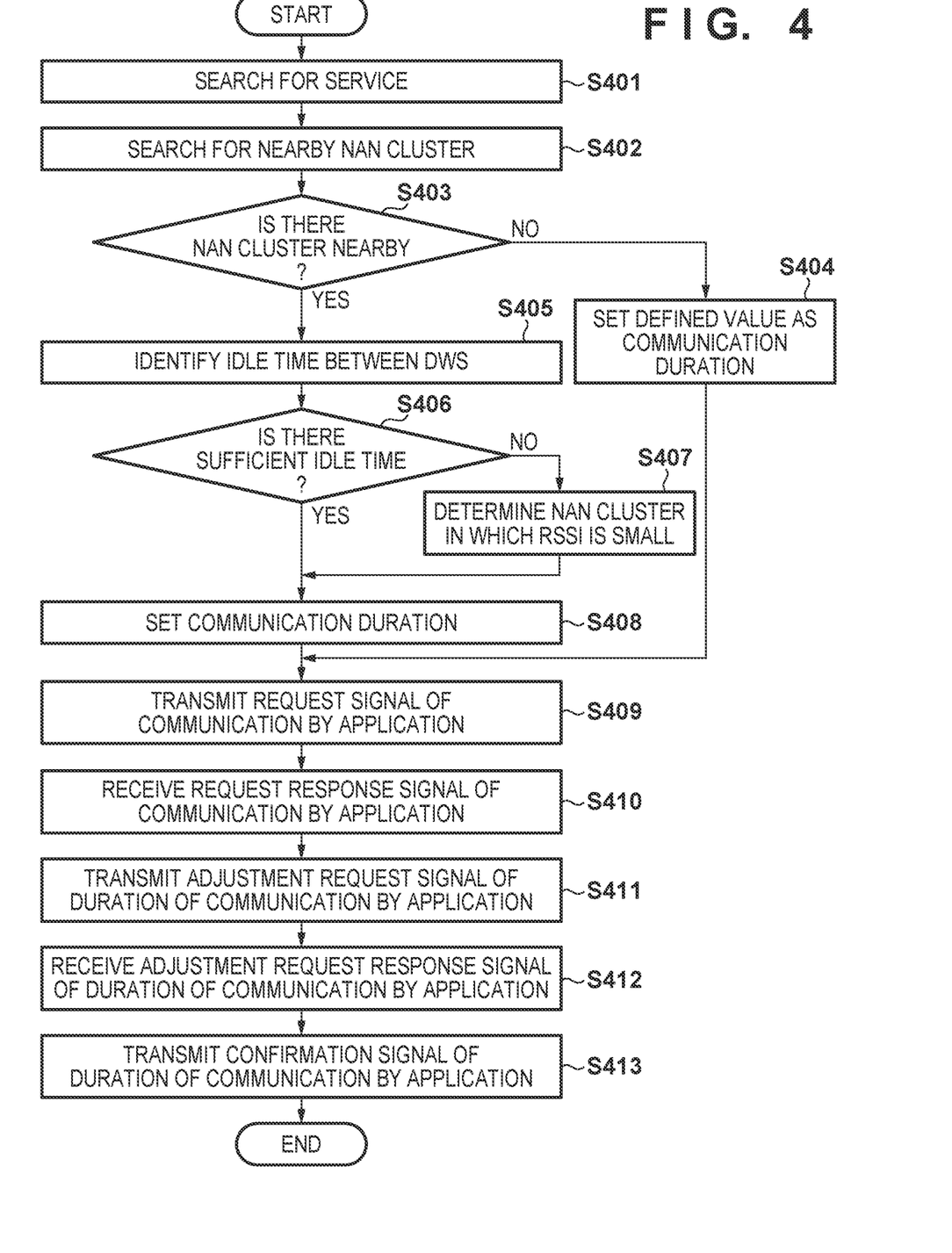
FIG. 4 is a flowchart illustrating the first example of the procedure of processing executed by the NAN device.

The first processing example executed by the NAN device 101 to search for a nearby NAN cluster before executing communication by the application and determine the communication duration of the application in accordance with the search result will be explained with reference to FIG. 4. Note that the processing of FIG. 4 is executed when the control unit 202 of the NAN device 101 executes a control program stored in the storage unit 201 to execute calculation and processing of information and control of the respective hardware components. Note also that some or all of the steps of the flowchart shown in FIG. 4 may be implemented by hardware such as an ASIC.

First, the NAN device 101 executes a search to determine whether a terminal capable of providing a service desired to be provided exists in the NAN cluster to which the NAN device 101 belongs (step S401). In this processing example, assume that the service desired to be provided is the photo sharing application, and the NAN device 101 performs communication by the application with the service providing apparatus in a duration other than the DW durations, thereby sharing photos.

If the NAN device 101 discovers an apparatus which provides the desired service, it searches for a nearby NAN cluster other than the NAN cluster to which the NAN device 101 belongs, before communication by the application (step S402). If it is determined that there is no NAN cluster nearby other than the NAN cluster to which the NAN device 101 belongs (NO in step S403), the NAN device 101 sets the defined value of the application as a communication duration (step S404). On the other hand, if it is determined that there is a NAN cluster nearby other than the NAN cluster to which the NAN device 101 belongs (YES in step S403), the NAN device 101 determines the timing in a duration of 512 TUs at which the DW duration of the NAN cluster is set. The 512 TUs indicate a cycle in which the DW duration comes, as described above. The NAN device 101 identifies an idle time during which no DW duration is set in the nearby NAN cluster in the duration of 512 TUs (step S405).

After that, the NAN device 101 determines whether there is a sufficient duration except for the duration set as the DW duration by the nearby NAN cluster to which the NAN device 101 does not belong (step S406). Here, there is a case where the length of a duration in the duration of 512 TUs, which corresponds to none of the DW durations in the nearby NAN clusters, may be insufficient for communication by the application, such as a case where there is a plurality of nearby NAN clusters to which the NAN device 101 does not belong, or the like (NO in step S406). In this case, the NAN device 101 measures the RSSI (Received Signal Strength Indicator) values of signals from the detected nearby NAN clusters (step S407). Each RSSI value may be measured from a sync beacon or the like transmitted by a NAN device belonging to the corresponding nearby NAN cluster or from another signal. Note that the RSSI value may be measured in advance, for example, at the time of a search for a nearby NAN cluster in step S402.

The NAN cluster in which the measured RSSI value is small is considered as a NAN cluster which is located at a position away from the NAN device 101. Therefore, even if the NAN device 101 performs communication by the application, interference with a signal transmitted in the NAN cluster is considered not to be large. Thus, the NAN device 101 can set, as the duration of itself for communication by the application, the DW duration used in the nearby NAN cluster in which the RSSI value is small (step S408). Note that the DW duration in which the RSSI value is small can be identified by determining a DW duration in which the RSSI value is equal to or smaller than a predetermined value or a predetermined number of DW durations from a DW duration in which the RSSI value is small. In this way, in accordance with the received signal strengths, the NAN device 101 identifies some of the detected NAN clusters as NAN clusters which are readily influenced, thereby identifying a duration for communication by the application from a duration except for the DW durations of the identified NAN clusters. Note that in this embodiment, if it is determined that a sufficient duration for communication by the application cannot be obtained (NO in step S406), the NAN clusters which are readily influenced are identified based on the RSSI values. The present invention, however, is not limited to this. For example, the NAN clusters which are readily influenced may be identified based on the RSSI values before the processing in step S405, and then the processing in step S405 may be performed for only the NAN cluster in which the RSSI value is larger than the predetermined value.

On the other hand, if it is determined that there is a sufficient duration except for the duration set as the DW duration by the other NAN cluster (YES in step S406), the NAN device 101 sets part of the idle time as a duration for communication by the application (step S408). Upon completion of setting of the duration for communication by the application which the NAN device 101 wants to execute, the NAN device 101 transmits a request signal for communication by the application to a terminal capable of providing the service (step S409). The NAN device 101 receives a response signal from the service providing terminal which has received the request signal (step S410). This can establish a connection for communication by the application. After that, the NAN device 101 transmits, to the service providing terminal, an adjustment request signal to request the terminal to perform communication in the duration determined in step S408 (step S411), and receives an adjustment request response signal from the service providing terminal which has received the adjustment request signal (step S412). Note that the adjustment request response signal can indicate (implicitly or explicitly) that performing communication in the duration requested by the adjustment request signal has been accepted. Upon receiving the adjustment request response signal, the NAN device 101 transmits, to the service providing terminal, a confirmation signal to confirm the finally determined duration for communication by the application (step S413).

The procedure of processing executed between the plurality of NAN devices 101 to 104 in the wireless communication system in this processing example will be described with reference to FIG. 5. Note that the NAN device 101 joins the NAN cluster 106 before the start of the processing shown in FIG. 5, and is in a state in which it can execute a search for a service in the DW duration of the NAN cluster 106.

The user of the NAN device 101 executes, via the input unit 204, an operation of, for example, activating the photo sharing application to start processing of searching for a photo sharing partner apparatus (S501). In the NAN cluster 106, the NAN device 102 sends a notification of the DW duration by a sync beacon (S502). Even after the start of the search processing, the NAN device 101 transmits no message before the DW duration comes, and broadcasts a subscribe message for searching for the photo sharing application in the DW duration (S503). Upon receiving the subscribe message, the NAN device 103 transmits, to the NAN device 101, as a response, a publish message indicating that the photo sharing application operates in itself (S504). The NAN device 101 can discover the NAN device 103 which provides the photo sharing application by receiving the publish message from the NAN device 103.

After that, the NAN device 101 searches for a nearby NAN cluster (S505). The NAN device 101 searches for a NAN cluster in, for example, a duration of a time length of 512 TUs corresponding to the cycle of the DW duration. The NAN device 101 can confirm the existence of a nearby NAN cluster by observing, for example, a sync beacon or discovery beacon transmitted in the nearby NAN cluster. Assume that in the search duration in S505, the NAN device 101 receives only the sync beacon of the NAN device 104 belonging to the NAN cluster 107 (S506), and recognizes the existence of the NAN cluster 107. Based on the sync beacon (S506) which could be received in the search duration in S505, the NAN device 101 identifies an idle time which is not used as the DW duration in the NAN cluster 107 in the duration of 512 TUs (S507). In accordance with the idle time identified in S507, the NAN device 101 determines the communication duration of the application in which communication in the DW duration of the NAN cluster 107 is not inhibited (S508).

Figure 8:
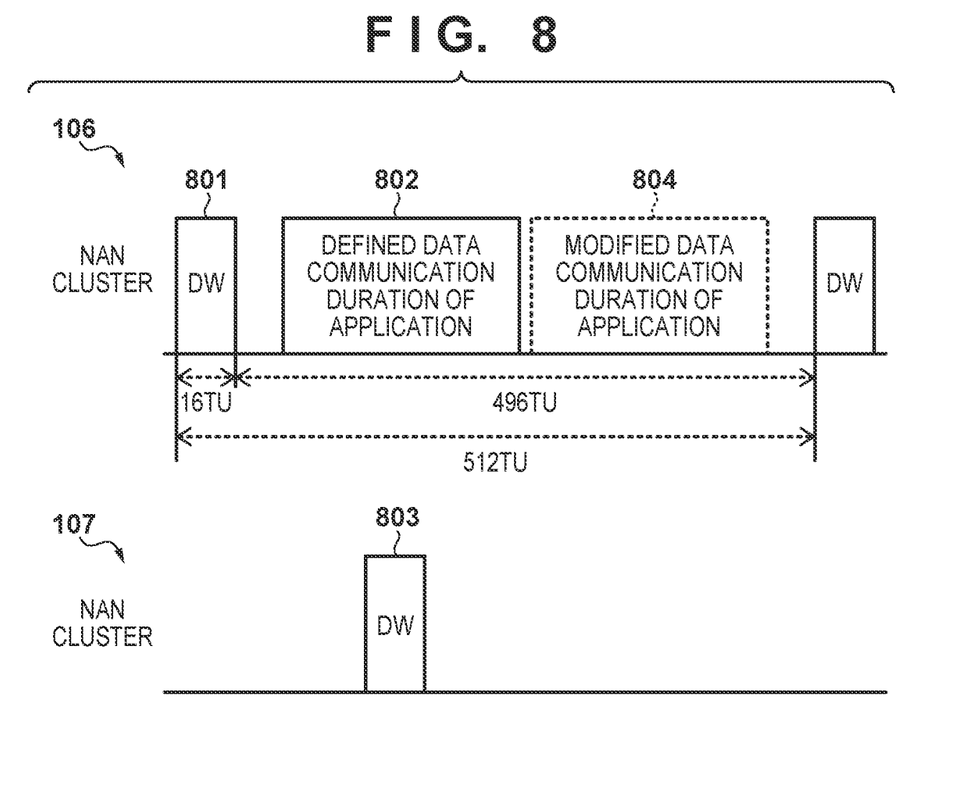
FIG. 8 is a schematic view showing communication duration setting processing.

The processing of identifying the idle time and the processing of determining the communication duration of the application will be described with reference to FIG. 8. In a DW duration 801, the NAN device 101 executes the processes in S502 to S504 to discover the NAN device 103 which provides the photo sharing application. After that, the NAN device 101 searches for a nearby NAN cluster (S505) in a duration of 496 TUs before the next DW duration. The NAN device 101 receives a sync beacon transmitted from the NAN device 104 belonging to the NAN cluster 107 in the DW duration of the NAN cluster 107, and recognizes a DW duration 803 of the NAN cluster 107. Upon recognizing the DW duration 803, the NAN device 101 can recognize that communication in the DW duration 803 of the NAN cluster 107 is inhibited in a defined communication duration 802 of the photo sharing application. As a result, the NAN device 101 can set, as the communication segment of the photo sharing application, a duration 804 which does not overlap the DW duration 803. Note that FIG. 8 shows an example in which the defined communication duration 802 does not overlap the set duration 804. However, it is only required that the set duration 804 does not overlap the DW duration 803 of the other NAN cluster 107, and the defined communication duration 802 and the set duration 804 may partially overlap each other.

Referring back to FIG. 5, if the NAN device 101 determines the communication duration in S508, it requests the NAN device 103 to establish a data link for allowing execution of communication by the photo sharing application. For example, the NAN device 101 transmits a service data link request signal to the NAN device 103 in the DW duration (S509). At this time, if the DW duration has ended, the NAN device 101 can wait for the next DW duration, and then transmit a service data link request signal. Note that in the publish message in S504, "further service availability" which indicates that service discovery/search control can be performed in a duration other than the DW duration may be given. In this case, in accordance with the information, even in a duration other than the DW duration, the NAN device 101 may transmit a service data link request signal at the timing when the NAN device 103 can receive a signal.

Upon receiving the service data link request signal, the NAN device 103 responds to the NAN device 101 by a service data link response signal (S510). Upon completion of these processes, the NAN devices 101 and 103 confirm to perform data link communication by the photo sharing application. After that, the NAN devices 101 and 103 determine a communication duration for performing data link communication. Upon receiving the service data link response signal, the NAN device 101 transmits, to the NAN device 103, a data link schedule request signal including the communication segment determined in S508 (S511). This is a message for giving an opportunity to start negotiation for determining a segment outside the DW duration in which data link communication is executed. Upon receiving the data link schedule request signal, the NAN device 103 responds to the NAN device 101 by a data link schedule response signal (S512). Upon receiving the data link schedule response signal, the NAN device 101 transmits a data link schedule confirm signal to finally confirm a duration in which data link communication is possible (S513).

In this processing example, the example in which a search for a nearby NAN cluster in S505 is performed in a duration from the publish message in S504 to the service data link request signal in S509 has been explained. However, this search may be performed at any timing before the data link schedule request signal is transmitted in S511. For example, the NAN device 101 may monitor/search for the existence of a nearby NAN cluster and the DW duration regardless of the timing of the message. The above-described processing allows the NAN devices 101 and 103 to perform communication by the photo sharing application in a communication segment in which communication in the DW duration of the NAN cluster 107 is not inhibited.

Processing Example 2

Figure 6:
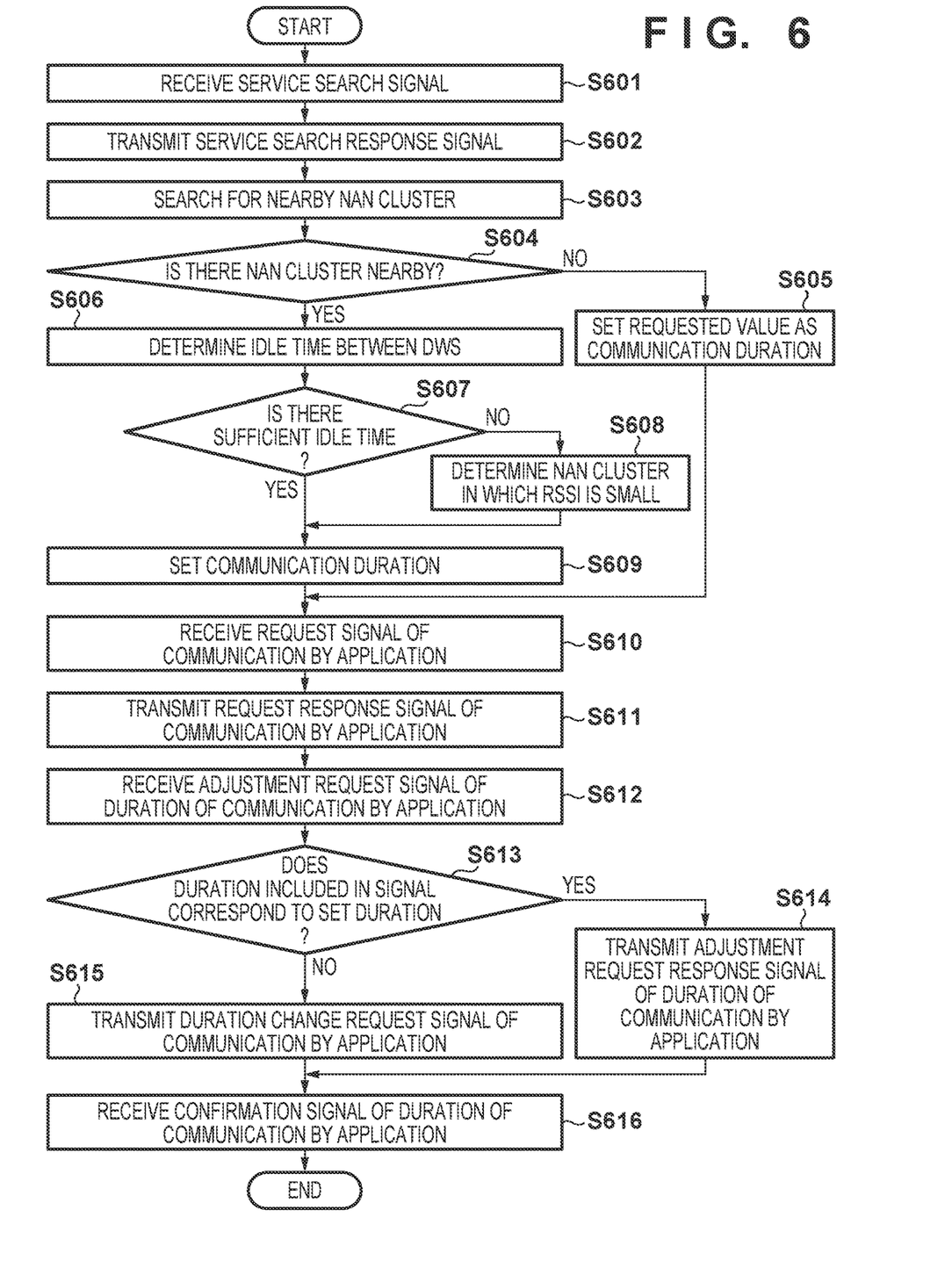
FIG. 6 is a flowchart illustrating the second example of the procedure of the processing executed by the NAN device.

The second processing example executed by the NAN device 101 to search for a nearby NAN cluster before executing communication by the application and determine the communication duration of the application in accordance with the search result will be described with reference to FIG. 6. In the processing example 1, the processing example when the NAN device 101 serves as a terminal which is provided with a service has been explained. In this processing example, a processing example when the NAN device 101 serves as a service providing terminal and the NAN device 103 requests provision of a service will be described. Assume that the NAN device 101 can provide the photo sharing service and the NAN device 103 requests provision of the photo sharing service.

The NAN device 101 receives a service search signal (step S601). If the service search signal in step S601 is a signal to search for a service providable by the NAN device 101, the NAN device 101 transmits a response signal to the terminal as the transmission source of the service search signal (step S602). Before communication by the application, the NAN device 101 searches for a nearby NAN cluster other than the NAN cluster to which the NAN device 101 belongs (step S603). If it is determined that there is no NAN cluster nearby other than the NAN cluster to which the NAN device 101 belongs (NO in step S604), the NAN device 101 waits for a request of a communication duration from the service request terminal without setting a communication duration. Upon receiving the request of the communication duration from the service request terminal, the NAN device 101 sets the requested value as a communication duration (step S605). On the other hand, if it is determined that there is a NAN cluster nearby other than the NAN cluster to which the NAN device 101 belongs (YES in step S604), the NAN device 101 determines a communication duration, similarly to the processes in steps S405 to S408 of FIG. 4 (steps S606 to S609).

Upon setting the communication duration, the NAN device 101 receives a request signal of communication by the application from the service request terminal (step S610) and, in response to the signal, transmits a response signal to the service request terminal (step S611). After transmitting the response signal in step S611, the NAN device 101 receives an adjustment request signal of the communication duration of the application from the service request terminal (step S612). The NAN device 101 determines whether the communication duration information included in the received adjustment request signal corresponds to the communication duration set by itself (step S613). If the these communication durations do not correspond to each other (NO in step S613), the NAN device 101 transmits a duration change request signal to the service request terminal to change the communication duration to that set by itself (step S615). Note that the duration change request signal can be transmitted in the format of a response signal to the adjustment request signal in step S612. After that, if the service request terminal acknowledges the change of the communication duration requested by the duration change request signal, the NAN device 101 receives a confirmation signal including information indicating it (step S616). This confirmation signal is a signal to confirm the finally determined duration for communication by the application. Note that if the service request terminal does not acknowledge the change of the communication duration requested by the duration change request signal, the processing ends without performing communication by the application. Note that in this case, negotiation may be performed again between the NAN device 101 and the service request terminal.

On the other hand, if these communication durations correspond to each other (YES in step S613), the NAN device 101 transmits, to the service request terminal, an adjustment request response signal including information which indicates that the communication duration requested in step S612 has been acknowledged (step S614). After that, the NAN device 101 receives, from the service request terminal, a confirmation signal to confirm the finally determined duration for communication by the application (step S616).

Figure 7:
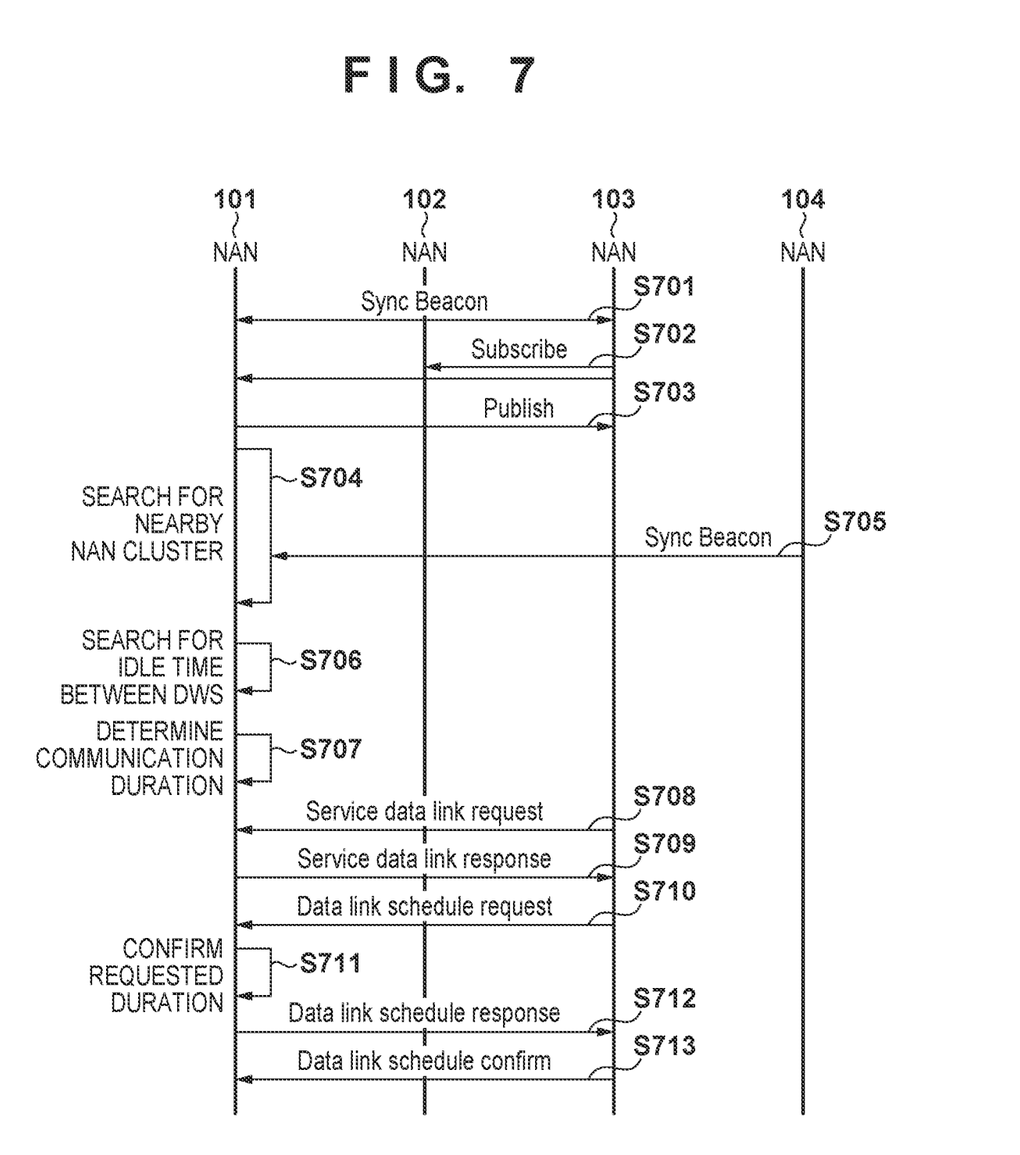
FIG. 7 is a sequence chart showing the second example of the procedure of the processing in the wireless communication system.

The procedure of processing executed between the plurality of NAN devices 101 to 104 in the wireless communication system in this processing example will be described with reference to FIG. 7. Note that in the following description, signals having the same names as those of the signals used in FIG. 5 are signals used for the same purposes as those of the signals in FIG. 5, unless otherwise specified.

Figure 5:
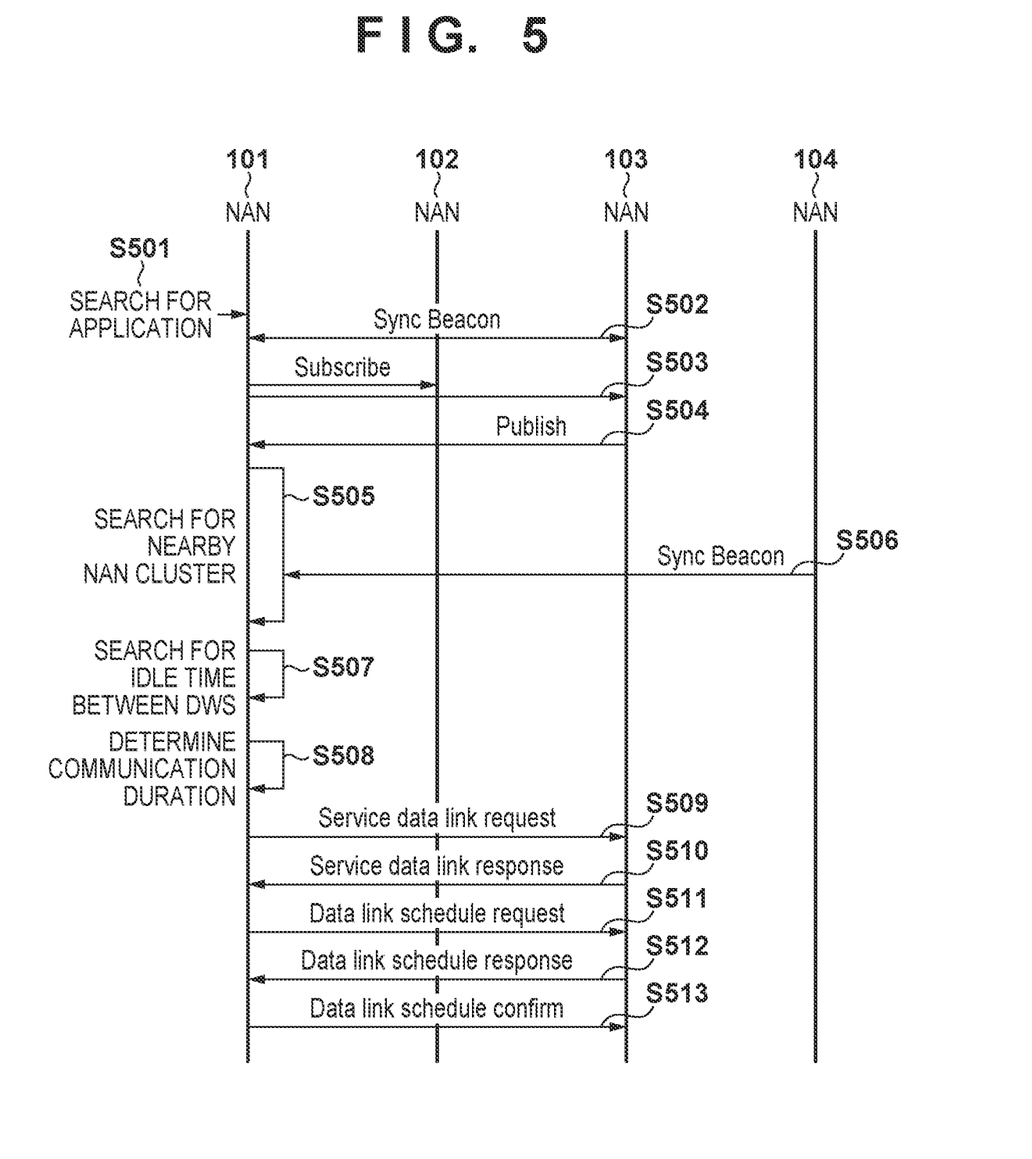
FIG. 5 is a sequence chart showing the first example of the procedure of processing in a wireless communication system.

Processing in S701 is the same as that in S502 of FIG. 5, in which the NAN device 102 sends a notification of the DW duration by a sync beacon. In the DW duration, the NAN device 101 receives a subscribe message broadcast from the NAN device 103 (S702). The NAN device 101 transmits, to the NAN device 103, a publish message indicating a state in which the NAN device 101 can provide the requested service (S703). After that, similarly to S505 to S508 of FIG. 5, the NAN device 101 executes a search for another NAN cluster and a determination of a communication duration (S704 to S707).

The NAN device 101 receives a service data link request signal from the NAN device 103 (S708), and transmits a service data link response signal to the NAN device 103 (S709). Upon completion of these processes, the NAN devices 101 and 103 confirm to perform data link communication by the photo sharing application. After that, the NAN devices 101 and 103 determine a communication duration for performing data link communication. Upon receiving the service data link response signal, the NAN device 103 transmits a data link schedule request signal to the NAN device 101 (S710). Upon receiving the data link schedule request signal, the NAN device 101 confirms whether a communication duration requested in the signal corresponds to the communication duration determined by itself (S711). Assume that in this processing example, as a result of confirmation in S711, the NAN device 101 determines that the requested communication duration does not correspond to the communication duration determined by itself. Therefore, the NAN device 101 requests, by a data link schedule response signal, to change the communication duration of the application to that determined by itself (S712). Assume that the NAN device 103 acknowledges the communication duration requested in the data link schedule response signal. In this case, the NAN device 103 transmits a data link schedule confirm signal to finally confirm a duration in which data link communication is possible (S713).

In this processing example as well, a search for a nearby NAN cluster may be performed at any timing before the data link schedule request signal in S710. The above-described processing allows the NAN devices 101 and 103 to perform communication by the photo sharing application in the communication duration in which communication in the DW duration of the NAN cluster 107 is not inhibited, even when the NAN device 101 serves as a service providing terminal.

According to the present invention, a communication apparatus can perform communication without inhibiting communication of another apparatus in a duration which periodically comes.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-008291, filed Jan. 19, 2016 which is hereby incorporated by reference herein in its entirety.

What is claimed is:
1. A communication apparatus comprising:
one or more processors; and
one or more memories including instructions that, when executed by the one or more processors, cause the communication apparatus to:
    perform wireless communication with a first other communication apparatus in a first Discovery Window of a first NAN (Neighbor Awareness Networking) cluster that the communication apparatus joins;
    determine a duration related to a second Discovery Window of a second NAN (Neighbor Awareness Networking) cluster that the communication apparatus does not join in a case where the communication apparatus detects the second NAN cluster;
    identify a communication duration used for data link communication with the first other communication apparatus and that does not overlap with any one of the first Discovery Window and the second Discovery Window; and perform, with the first other communication apparatus and in the first Discovery Window, communication for starting the data link communication with the first other communication apparatus, the data link communication being performed using the identified communication duration.

2. The communication apparatus according to claim 1, wherein
in a case where a received signal strength of a first signal that is transmitted from the second NAN cluster is greater than a predetermined threshold, the communication apparatus identifies the communication duration that does not overlap with any one of the first Discovery Window and the second Discovery Window.

3. The communication apparatus according to claim 1, wherein
the communication apparatus transmits, to the first other communication apparatus in the first Discovery Window, a second signal for starting the data link communication using the identified communication duration and with the first other communication apparatus.

4. The communication apparatus according to claim 3, wherein
the communication apparatus receives, from the first other communication apparatus, a third signal including information of a communication duration that is to be used for the data link communication with the first other communication apparatus, and
in a case where the received communication duration included in the third signal does not correspond to the identified communication duration, the communication apparatus does not transmit the second signal.

5. The communication apparatus according to claim 1, wherein
the communication apparatus wirelessly communicates, in the first Discovery Window and with the first other communication apparatus, a signal including information of a service searched by the communication apparatus or the first other communication apparatus.

6. The communication apparatus according to claim 1, wherein the communication apparatus performs notification of the identified communication duration.

7. The communication apparatus according to claim 1, wherein determination of a duration related to the second Discovery Window is determination of a duration that is different from the second Discovery Window.

8. A control method for a communication apparatus, comprising:
performing wireless communication with a first other communication apparatus in a first Discovery Window of a first NAN (Neighbor Awareness Networking) cluster;
determining a duration related to a second Discovery Window of a second NAN cluster that the communication apparatus does not join in a case where the communication apparatus detects the second NAN cluster;
identifying a communication duration used for data link communication with the first other communication apparatus and that does not overlap with any one of the first Discovery Window and the second Discovery Window; and
performing, with the first other communication apparatus and in the first Discovery Window, communication for starting the data link communication with the first other communication apparatus, the data link communication being performed using the identified communication duration.

9. A non-transitory computer-readable storage medium storing a computer program for causing a computer, included in a communication apparatus, to
perform wireless communication with a first other communication apparatus in a first Discovery Window of a first NAN (Neighbor Awareness Networking) cluster;
determine a duration related to a second Discovery Window of a second NAN cluster that the communication apparatus does not join in a case where the communication apparatus detects the second NAN cluster;
identify a communication duration used for data link communication with the first other communication apparatus and that does not overlap with any one of the first Discovery Window and the second Discovery Window; and
perform, with the first other communication apparatus and in the first Discovery Window, communication for starting the data link communication with the first other communication apparatus, the data link communication being performed using the identified communication duration.

* * * * *